GOWDY & WELSH.

Hominy Machine.

No. 1,919.

Reissued March 28, 1865.

N. PETERS. Photo-Lithographer. Washington. D. C.

UNITED STATES PATENT OFFICE.

R. E. RICHARDSON, OF XENIA, OHIO, ASSIGNEE BY MESNE ASSIGNMENTS OF J. B. GOWDY AND J. A. WELSH.

IMPROVEMENT IN HOMINY-MILLS.

Specification forming part of Letters Patent No. 17,966, dated August 11, 1857; Reissue No. 1,919, dated March 28, 1865.

*To all whom it may concern:*

Be it known that J. B. GOWDY and J. A. WELSH, of Xexia, in the county of Greene and State of Ohio, did invent a new and Improved Hominy-Mill, of which the following is a full, clear, and exact description, reference being had to the accompanying drawings, making part of this specification, and to the letters of reference marked thereon, making part of this specification, in which—

Figure 1:
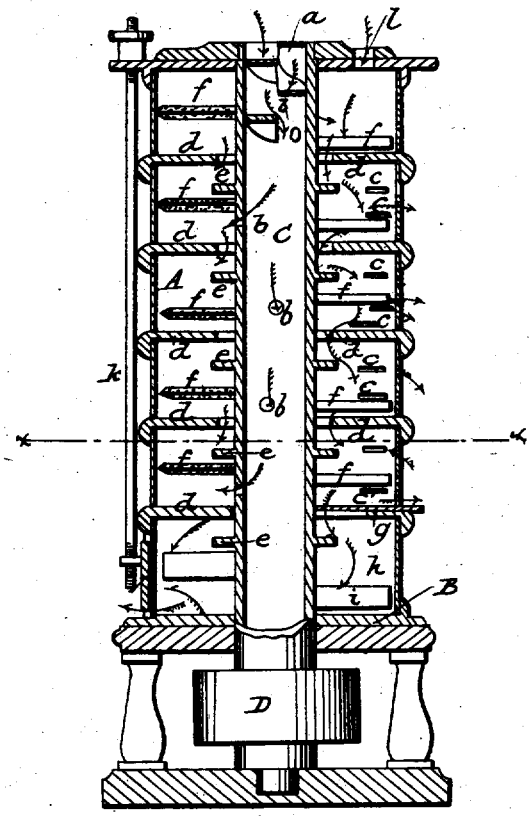
Figure 2:
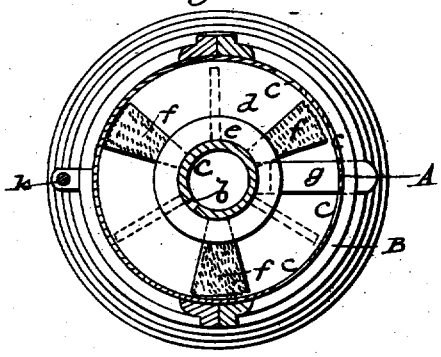

Figure 1 is a vertical sectional view, and Fig. 2 a transverse horizontal section of the same.

The following description will enable those skilled in the art to fully understand and construct the said invention.

Prior to this invention mills of this class had usually been constructed of a single tube or apartment, through which the corn passed while being operated upon by the crushing, scouring, or hulling apparatus, which latter, in vertical mills, usually consisted of a single shaft without arms or beaters, and having its sides or edges roughened to operate upon the grains. Such machines were found to work very imperfectly.

To obviate the difficulties and render the operation more perfect and satisfactory, this machine was invented.

A represents a vertical shell or case mounted on a suitable base or bed, B, and having a vertical tubular shaft, C, fitted centrally within it, and extending its entire length. The case A is divided into a series of compartments by means of the disks or plates *d*, of which more or less may be used, as desired. The plates *d* are made of cast-iron of proper size to fit the casing, to which they may be secured in any suitable manner. Each of the plates *d*, except the lower one, has a circular opening at its center, as shown at *e*, Fig. 2. This opening is of such a size as to admit the shaft C, and still leave an open annular space between the outside of the shaft and the inner edge of the plates, as clearly shown in Figs. 1 and 2. The shaft C may be provided with a thin spiral flange or screw, *a*, on its interior, as shown in Fig. 1, for the purpose of drawing the air into and down said tube, said air passing out through the openings *b* into the various compartments, as indicated by the dotted arrows in Fig. 1. A series of arms or beaters, *f*, project radially from the shaft C, extending out nearly to the sides of the case A, these being so arranged as to have two or more in each compartment. These beaters *f* are constructed in the form of flat blades, as shown in Fig. 2, and have their faces or sides and ends made rough, like a coarse file or rasp, though it is evident that they may be made of various forms and sizes. A series of radially-projecting flanges, *e*, may, if desired, be cast solid with, or otherwise attached to the outer surface of shaft C, in such positions as to bring one within each compartment, as shown in the drawing in Fig. 1. These flanges *e* should be equal to or slightly greater in diameter than the central openings in the plates *d*. In the lower compartment the shaft C is provided with a series of flat beaters, *i*, which have their edges placed in a vertical position, thus operating both as beaters and as a fan, for assisting in creating a draft from above downward. By making these beaters or wings *i* of sufficient width the spiral fan or flanges *a* in the top of the tubular shaft C may be dispensed with.

The case A may be made of either sheet metal or cast-iron, or of both combined, as may be deemed most desirable; and it is provided with perforations or openings *c*, more or less numerous, for the escape of the meal, dust, and other refuse matter. A larger opening is made in the case A at one side of the lower compartment, which opening is closed by a gate or door, *j*, operated by the rod *k*. A slide, *g*, is fitted to the opening in the lower plate *d*, by which said opening may be regulated or closed at pleasure. An opening is provided in the cover or top of the case A, through which the grain is introduced, and a pulley, D, is attached to the shaft C for giving it motion.

The operation is as follows: Motion is imparted to the shaft C, and the corn or other substance to be operated upon is fed in through the opening in the top; a suitable hopper or other device being provided for that purpose. As the corn falls into the first or upper compartment, it is beaten, cracked, and scoured by the revolving beaters *f*. From this compartment it passes through the circular opening in plate *d*, down into the compartment next below, falling, as it thus passes down, upon the flange *e*, by which it is deflected and thrown outward into the second chamber or compartment, where it is still further subjected to the scouring, cracking, and hulling process by the beaters or arms *f* revolving therein, the bran, dust, meal, and finer particles being forced out through the openings *c* in the case A by the centrifugal force of the beaters *f*. In this manner the process is continued through the various chambers or compartments until the corn reaches the lower plate *d*, where its further downward progress is arrested until the slide *g* is withdrawn, when it passes down into the lower compartment, from which it is expelled by the wings or beaters *i* as soon as the door *j* is opened for that purpose.

It is obvious that by having a sufficient number of these compartments, and regulating the feed properly, so as to complete the process by the time the corn shall have arrived at the lower compartment, the process may be rendered continuous, and the corn fed in at the top be caused to flow out at the bottom, a finished article, in one continuous stream, the slides *g* and *j*, of course, in that case, being dispensed with, or the openings left open for the passage of the grain. It is also obvious that the flanges *e* need not be made continuous around the shaft or tube C, but may be constructed in the form of arms or sections, and made to produce the same or a similar result, as the corn in falling from above through the circular openings in the plates *d* must strike upon these rapidly-revolving flanges or arms, and will, by the centrifugal force thereof, be projected laterally into the compartments, as indicated by the arrows.

This invention enables us to produce a very superior article of hominy without soaking or wetting the corn, as has heretofore been practiced and found necessary in order to remove the hulls or skins. At the same time it removes all the bran, hulls, dust, and finer particles or meal, and by one single operation produces a perfect article ready for use or for packing and shipment, without the expense, trouble, and delay of drying the same, as was formerly done.

Having thus fully described the invention, its construction and operation, what I claim, and desire to secure by Letters Patent of the United States, is—

1. Constructing a hominy-mill with a series of chambers or compartments placed one above another, substantially as specified.

2. In combination with a series of compartments, as described, the central openings for the passage of the grain, substantially as set forth.

3. The beaters *f*, when arranged to operate in connection with a series of chambers, as herein described.

4. The tubular shaft C, arranged to operate as set forth.

5. The deflecting-flanges *e*, or their equivalents, when arranged and operating substantially as herein set forth.

R. E. RICHARDSON,
*Assignee of Gowdy and Welsh.*

Witnesses:
H. C. DODGE,
JOHN BLACKIE.